Dec. 14, 1926.
E. HOMAN ET AL
1,610,782
DISHWASHING MACHINE
Filed April 15, 1926
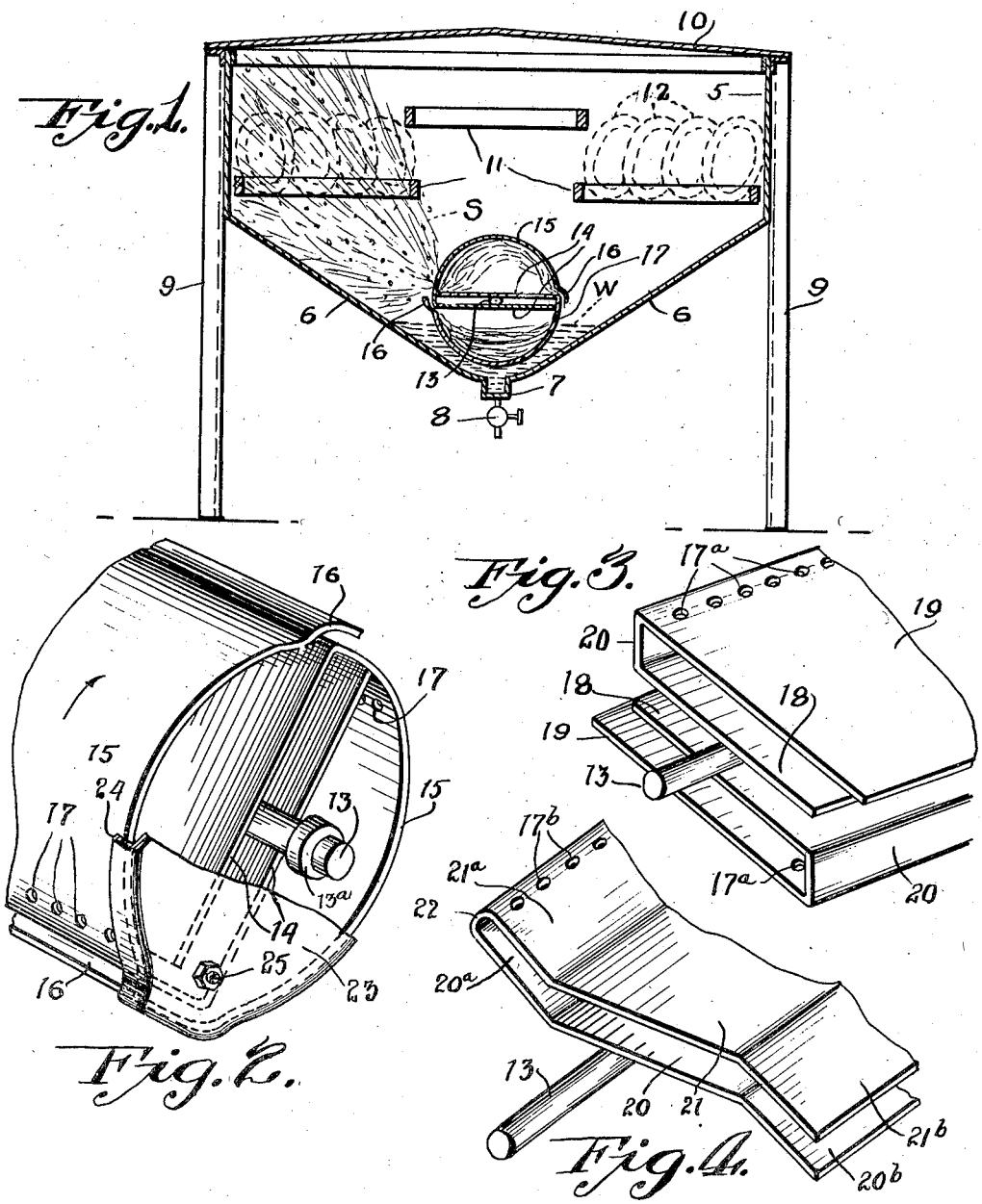
INVENTOR
E. Homan & F.L.Cole
BY
ATTORNEY.

Patented Dec. 14, 1926.

1,610,782

UNITED STATES PATENT OFFICE.

EMIL HOMAŃ AND FRANK L. COLE, OF FORT ATKINSON, WISCONSIN.

DISHWASHING MACHINE.

Application filed April 15, 1926. Serial No. 102,170.

This invention relates to certain new and useful improvements in dishwashing machines of the type wherein the dishes supported upon racks above the water level in a closed receptacle have water sprayed thereover for cleansing the dishes.

The primary object of the invention is to provide a dishwashing machine embodying a rotary water impeller partially submerged and rotating in a tank of water for picking up the water and thru the medium of centrifugal force spraying the water over the dishes that are supported upon racks within the tank above the water level therein.

With the above and other objects in view that will become apparent as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a vertical cross-sectional view of a dishwashing machine constructed in accordance with the present invention showing the tank or receptacle having dish racks therein and a rotary water impeller journaled in the tank adjacent the lower end for spraying water on the dishes supported on racks above the water level in the receptacle, Figure 2 is a fragmentary perspective view of the preferred form of impeller, and Figures 3 and 4 are fragmentary perspective views showing two different types of water impellers.

In the accompanying drawing which shows the preferred embodiments of the invention, and with particular reference to Fig. 1, the reference numeral 5 designates the tank or receptacle of the dishwashing machine having a conical bottom wall 6 terminating at its lower end in a drain trough 7 with which a drain valve 8 is associated, the receptacle being supported upon legs 9 while a removable cover 10 overlies the upper end of the receptacle as illustrated. A plurality of dish racks 11 for supporting the dishes 12 illustrated by dotted lines are conveniently positioned in the receptacle 5, preferably adjacent the side walls thereof and centrally of the receptacle as shown in Fig. 1.

A rotary water impeller is journaled longitudinally of the receptacle adjacent the lower end of the conical bottom 6 and as shown in detail in Fig. 2 comprises a longitudinally extending bearing shaft 13 journaled in the end walls of the receptacle, babbitted in a center bur 13ª, and operated either manually or by motive power. The impeller as shown in Fig. 2 is circular in cross-section and is formed of two semi-circular sections each comprising a flat cross wall 14 and a semi-circular wall 15 formed integral with one side edge of the cross wall with the free edge of the semi-circular wall 15 flared outwardly of the closed side edge of the other impeller section as clearly shown in Figs. 1 and 2. The cross walls 14 of the two impeller sections enclose the journaled shaft 13 and are suitably secured thereto with the free edge of the cross walls 14 intimately contacting the curved walls 15 of the cooperating impeller sections. As shown in Fig. 2, the ends of the impeller sections are closed by end walls 23 of a configuration in plan view corresponding to the end elevation of the impeller with an edge flange 24 inclosing the edge of the impeller to prevent the escape of water through the ends of the impeller. The end walls 23 are retained in position by tie rods 25 extending longitudinally of the impeller and anchored at their ends to the end walls. Each impeller section substantially forms a compartment having an inlet at the outwardly flared side edge 16 of the semi-circular wall 15 while the outlet for the compartment is in the form of spaced openings 17 arranged in a row and extending longitudinally of the semi-circular wall 15 adjacent the closed side edge thereof.

Water designated by the character W is placed in the receptacle, preferably at the height indicated in Fig. 1 with the rotary impeller partially submerged therein and when the impeller is rotated in the direction of the arrow as shown in Fig. 1 the water is gathered into the separate compartments of the impeller by the outwardly flanged side edge 16 and during rotation of the impeller, the water is sprayed at S through the openings 17 and onto the dishes 12 supported upon the racks 11. After the dishes have been thoroughly cleaned by the use of soapy water or the like, the water may be drained from the trough 7 through the pet-cock 8 and clear rinsing water substituted for rinsing the dishes.

In the form of the invention shown in Fig. 3, the impeller is formed of a pair of U-shaped plate members embodying inner and outer plates 18 and 19 connected by an end wall 20 with the plate 19 extending beyond the free edge of the plate 18 while the closed end of the impeller section in the plate 19 there is provided a series of openings 17$^a$ to effect the spraying of the water. The inner plates 18 of the two sections are arranged at opposite sides of the shaft 13 and are secured thereto in any suitable manner. The water is gathered into the U-shaped impeller section by the extended side edge of the outer plate 19 and during the rotation of the impeller is discharged in a spray-like form through the openings 17$^a$.

In the form of the invention shown in Fig. 4 the impeller embodies inner and outer plates 20 and 21 spaced from each other with the inner plate 20 secured to the shaft 13, the ends of the plates 20 and 21 being bent in opposite directions as at 20$^a$—20$^b$ and 21$^a$—21$^b$ with the bent ends 20$^a$ and 21$^a$ connected by the side walls 22 while the bent end 21$^a$ is provided with spray openings 17$^b$ adjacent its outer end.

While there are herein shown and described the preferred embodiments of the present invention, it is, nevertheless to be understood that minor changes may be made therein without departing from the spirit and scope of the invention as claimed.

What is claimed as new is:—

1. In a dish washing machine, a receptacle, dish racks in the receptacle, a rotary impeller in the receptacle adjacent the bottom thereof below the racks for elevating water in the bottom of the receptacle and spraying the same over dishes supported on the racks, said impeller comprising a driven shaft, a cylindrical impeller body, transverse partitions in the body dividing the same into side compartments, said partitions being secured to said shaft, said compartments having diametrically opposite unobstructed longitudinally extending water entrance slots on one side and the opposite side of each compartment having a longitudinal series of perforations for spraying water from the compartments during rotation of the impeller.

2. In a dish washing machine, a receptacle, dish racks in the receptacle, a rotary impeller in the receptacle adjacent the bottom thereof below the racks for elevating water in the bottom of the receptacle and spraying the same over dishes supported on the racks, said impeller comprising a driven shaft, a cylindrical impeller body, transverse partitions in the body dividing the same into side compartments, said partitions being secured to said shaft, said compartments having diametrically opposite unobstructed longitudinally extending water entrance slots on one side and the opposite side of each compartment having a longitudinal series of perforations for spraying water from the compartments during rotation of the impeller, and a lip extension carried by the edge wall of the slot of each side compartment overlying the side of the opposite compartment and spaced outwardly thereof.

3. In a dish washing machine, a receptacle, dish racks in the receptacle, a rotary impeller in the receptacle adjacent the bottom thereof below the racks for elevating water in the bottom of the receptacle and spraying the same over dishes supported on the racks, said impeller comprising a driven shaft, an impeller body having inner and outer side walls, the inner side wall being secured to the shaft, and one wall of the body having a water entrance slot at one side and a series of perforations at the opposite side constituting spray openings.

In testimony whereof we affix our signatures.

EMIL HOMAN.
FRANK L. COLE.